Figure 4:
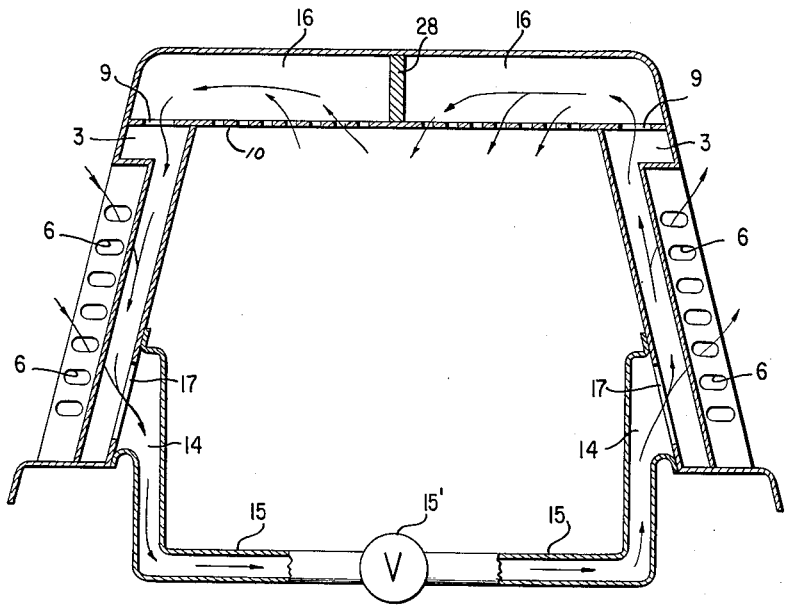

Oct. 23, 1962     K. WILFERT     3,059,561
VENTILATION SYSTEM FOR MOTOR VEHICLES
Filed Oct. 10, 1958     2 Sheets-Sheet 1
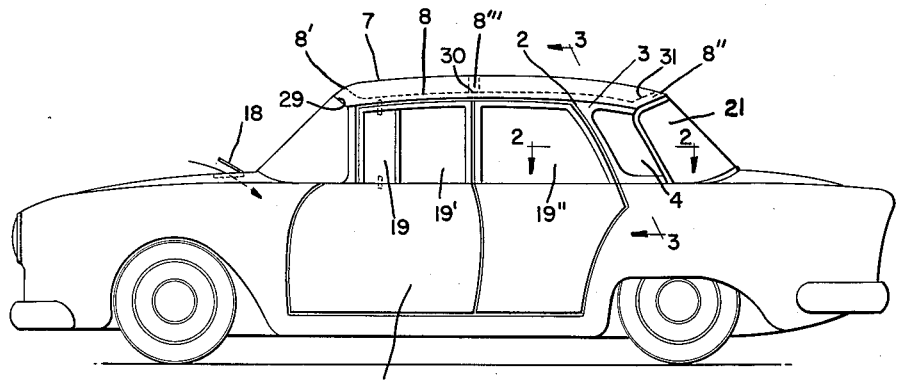
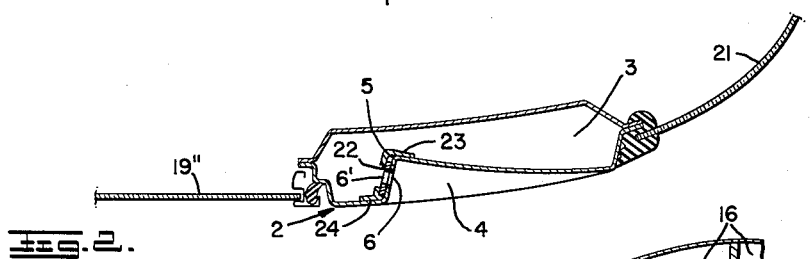
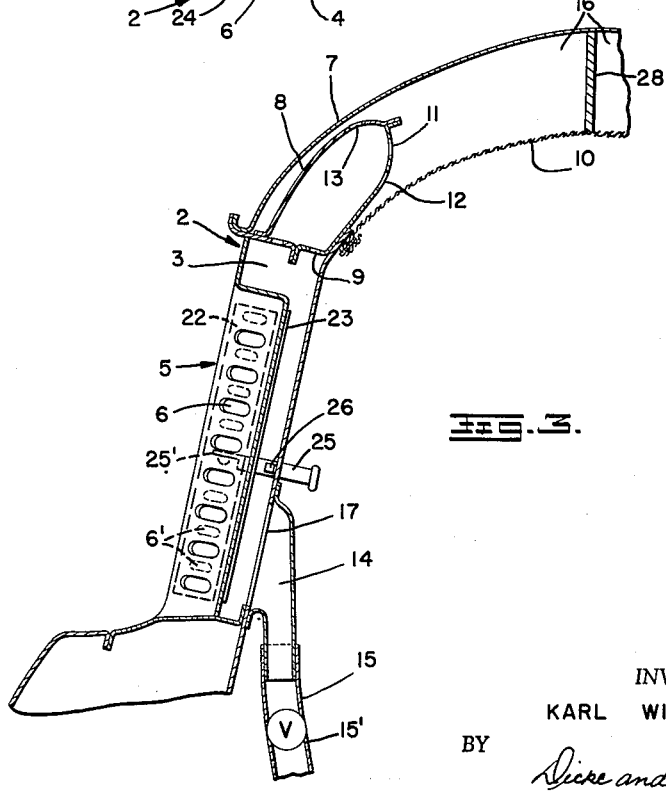
INVENTOR.
KARL WILFERT
BY *Dicke and Craig*
ATTORNEYS Oct. 23, 1962   K. WILFERT   3,059,561
VENTILATION SYSTEM FOR MOTOR VEHICLES
Filed Oct. 10, 1958   2 Sheets-Sheet 2

INVENTOR.
KARL WILFERT
BY Dicke and Craig
ATTORNEYS.

United States Patent Office 3,059,561
Patented Oct. 23, 1962

3,059,561
VENTILATION SYSTEM FOR MOTOR VEHICLES
Karl Wilfert, Stuttgart-Degerloch, Germany, assignor to Daimler-Benz Aktiengesellschaft, Stuttgart-Unterturkheim, Germany
Filed Oct. 10, 1958, Ser. No. 766,562
Claims priority, application Germany Oct. 12, 1957
11 Claims. (Cl. 98—2)

The present invention relates to a ventilation system for motor vehicles adapted, for example, to supply fresh ventilating air or exhaust stale air from the vehicle, which may possibly also be used in connection with a forced-draft air circulating system.

The ventilating installations for motor vehicles known to date in the prior art have for the most part the disadvantage that the fresh air cannot be supplied in a draft-free manner or cannot be evenly distributed, and more particularly, the ventilation in the prior art system takes place in such a manner that in the vicinity of the air supply an intensive ventilation takes place, whereas at other places only a slight or no ventilation at all takes place.

The present invention is intended to obviate the aforementioned inadequacies and shortcomings of the prior art devices and to supply the air to the interior space of the motor vehicle in an evenly distributed manner, while avoiding the appearance or occurrence of any draft. Moreover, the air exhaust or discharge is to be so constructed in accordance with the present invention that a draft-free exhaust or discharge of the air is assured.

The present invention essentially consists in that the ventilation such as supply or exhaust of air takes place through channels arranged behind the rear edge of the vehicle door, preferably, however, within the door post or column adjacent thereto which channels are in communication with the atmospheric air by appropriate apertures in the outer body walls of the vehicle body and which supply or exhaust fresh air to the vehicle interior through the interior roof covering through the so-called ceiling of the vehicle, or which remove or exhaust stale air from the vehicle interior. A channel or duct extending approximately parallel to the rear edge of the door may serve as ventilating channel which possibly may use or occupy the entire space between the rear edge of the door and the rear window pane. A hollow roof bearer member which extends between the outer sheet metal body wall of the roof and the ceiling or inner roof covering may be operatively connected in series with the ventilating channel, whereby the roof bearer member may be used simultaneously, at least in part, as ventilating channel.

The present invention aims at a ventilating system and installation operative to remove or supply the air, which is admitted or discharged behind the rear edge of the door, from or to the interior vehicle space respectively through the aforementioned ventilating channel approximately at the height of the upper door edge or thereabove, while overcoming as small as possible a resistance through invisible air inlet apertures and distributed as finely and as draft-free as possible.

The simplest case or construction in accordance with the present invention is present if the air, for example, leaving the aforementioned ventilating channel in the upward direction is supplied directly to the space or plenum chamber formed between the roof or ceiling material and the outer sheet-metal roof body wall from where the air, well distributed by the porous material of the vehicle ceiling may readily flow into the interior space of the motor vehicle. The ventilating channel in the rear door post or column is, therefore, provided at the upper end thereof, with apertures for purposes of enabling the further flow of the air, which apertures conduct the air directly into the space or plenum chamber between the sheet-metal outer body wall of the roof and the ceiling material.

However, in all cases, such a direct transfer of air from the ventilating channel in the rear door post into the space formed between the ceiling and the roof sheet-metal outer body wall is not possible, especially not, if a hollow longitudinal roof bearer member extends along the roof edge. In that case, the air is conducted at first from the ventilating channel through apertures provided along the upper end thereof into this hollow longitudinal bearer member, is then conducted therefrom into the space between the ceiling and the roof by apertures provided preferably along the side of the longitudinal bearer member facing the vehicle interior and the ceiling material, and is thereupon conducted from this space through the ceiling material into the space to be ventilated. Depending on how the distribution of air is desired, the apertures in the longitudinal bearer member may be arranged either evenly distributed or distributed only within a limited region on the longitudinal side thereof. The cross bearer members serving to interconnect and brace the longitudinal bearer members of the roof may also be used in connection with the air supply system whereby the cross bearer members may also be provided, either additionally or exclusively with corresponding apertures. However, in that case, the air supply for the ventilation system in accordance with the present invention is appropriately divided into two systems in the longitudinal direction of the vehicle.

With a forced-draft ventilation, recirculated air is circulated for the most part and additionally fresh air in part supplied or exhausted as discharged air. The proportion between recirculated air, on the one hand, and supplied fresh air or exhausted air, on the other, may be varied by a corresponding adjustable mechanism varying the controlling cross section thereof. However, it is also possible to change the position of the inlet place for the recirculated air supplied to the recirculating system in relation to the inlet apertures for the fresh air.

The ventilation system in accordance with the present invention enables a number of functions which produce a number of distinct advantages for a ventilation system in accordance with the present invention, as compared to the known installations of the prior art:

For example, with a normally open, forced draft ventilation forcing fresh air under pressure through an aperture usually disposed on the cowl or front end of the vehicle during movement of the vehicle, the air is supplied through one or several inlet apertures arranged possibly at the front end of the vehicle and is conducted, as a result of the excess pressure within the vehicle interior space, through the ceiling material, possibly also through the hollow roof longitudinal bearer members, and through the ventilating channel in the rear door post into the atmosphere through the air discharge apertures.

If the rotatable window such as the small side window normally rotatable about a vertical axis and disposed in front of the lowerable side window of the front door or to the rear of the lowerable rear window, is opened, then air is drawn out of the vehicle and a partial vacuum prevails within the interior of the vehicle. The air flow now takes place in the reverse direction from that described hereinabove. Air flows in that case through the air inlet apertures into the ventilating channel and is thereby conducted, possibly through the longitudinal bearer member and through the ceiling material evenly distributed into the interior of the vehicle.

The ventilation in accordance with the present invention is also particularly effective, without causing any draft, when the vehicle stands still and a side wind exists, i.e., a wind blowing in the direction toward the side of the vehicle. The air then enters on one side of the motor vehicle through the air inlet apertures or slots, is supplied through the ventilating channel, possibly through the longitudinal bearer members of the roof, and through the ceiling material into the interior of the vehicle and leaves on the opposite side thereof in that it takes the reverse path through the aforementioned channels. However, the space between the sheet-metal roof body wall and the ceiling material as well as the cross bearer members insofar as they are used in connection with supply system of air, have to be divided in the vehicle longitudinal center plane as otherwise the air would not take the path through the vehicle interior space.

Accordingly, it is an object of the present invention to provide a ventilating system for motor vehicles which obviates the disadvantages of the prior art and which offers a draft-free or essentially draft-free ventilation of the vehicle interior space.

Still another object of the present invention is to provide a ventilation system for motor vehicles which is versatile in its uses and functions and offers several advantages not found heretofore in the prior art devices while at the same time assuring the absence of any drafts within the vehicle interior space.

A still further object of the present invention resides in the provision of a ventilation system for motor vehicles for supplying air to the interior space of the vehicle or exhausting stale air as well as fresh air therefrom which utilizes the ceiling material of the vehicle so as to assure a fine and even distribution of the air and a minimum of draft or complete absence of draft while at the same time enabling a simple control for different operating conditions.

Still another object of the present invention is the provision of a ventilating system which utilizes certain bearer or frame members as ventilating channels and which makes use of the space ordinarily present in modern-day vehicles between the outer sheet-metal body wall of the roof and the interior ceiling material as plenum chamber for the distribution of the air.

A still further object of the present invention resides in the provision of a ventilating system for supplying or exhausting air from the vehicle interior space which may be readily interconnected or combined with a forced draft system.

These and other objects, features and advantages of the present invention will become more obvious from the following description when taken in connection with the accompanying drawing, which shows, for purposes of illustration only, one embodiment in accordance with the present invention, and wherein:

FIGURE 1 is a side view of a motor vehicle having a ventilation system in accordance with the present invention, FIGURE 2 is a horizontal cross sectional view on an enlarged scale through the side wall and ventilating channel of the motor vehicle in accordance with the present invention and taken along line 2—2 of FIGURE 1, FIGURE 3 is a vertical cross sectional view on an enlarged scale through the side of the motor vehicle having a ventilating system in accordance with the present invention and taken along line 3—3 of FIGURE 1, and FIGURE 4 is a somewhat diagrammatic cross-sectional view of another embodiment showing the operation of a forced-air ventilating system in accordance with the present invention.

Referring now to the drawing, wherein like reference numerals have been used throughout the various views to designate like parts, and more particularly to FIGURE 1, reference numeral 1 generally designates therein the motor vehicle, the interior space of which is ventilated essentially by the ventilating channel 3 extending approximately parallel to the rear door edge 2, possibly in conjunction with an air flap 18 disposed on the hood and/or with a rotary side window 19 disposed, for example, in front of the lowerable side window 19' in the front door or in front or to the rear of the lowerable side window 19" of the rear door. This air or ventilating channel 3 occupies the entire space between the rear door edge 2 and the rear window pane 21 and is provided with a pocket-like indentation 4 which as shown in FIGURE 2 has a triangularly-shaped cross section along the outside thereof which forms part of the vehicle outer body walls. Several air inlet slots or apertures 6 are arranged in the forwardly disposed side 5 of this indentation or pocket 4. In some motor vehicles, longitudinal bearer members 8 are arranged within the region of the lower edge of the roof 7 which longitudinal bearer members 8 are interconnected in front and in the rear thereof by means of cross bearer members 8' and 8" as well as possibly by a further cross bearer member 8''' within the region of the center door post or column.

Basically, the ventilating arrangement according to the present invention intends to provide a system in which the air supplied through the slots or apertures 6 to the ventilating channel 3 is to be conducted through apertures 9, for example, through slots, bores, or the like, over the shortest possible path out of channel 3 into the space or plenum chamber 16 between the ceiling material 10 and the roof sheet metal body wall 7, and from there through the ceiling material 10 into the interior space of the motor vehicle. If now with some vehicles, the hollow longitudinal roof bearer members 8 mentioned hereinabove are present, then the air is conducted at first from the ventilating channel 3 through slots 9 into the interior of the longitudinal bearer members 8. The longitudinal bearer members 8 themselves may be provided with apertures 11 and 12 (FIG. 3) arranged, for instance, in the direction toward the ceiling material 10; however, the apertures in the longitudinal bearer members 8 may also be arranged additionally or instead, though in smaller numbers, on the other side, as for example indicated by apertures 13 (FIG. 3). The apertures 11, 12 and 13 may be arranged exclusively within the region of the ventilating channel 3 above the same or may be distributed evenly over the entire length of the longitudinal bearer members 8 or may be distributed in a number of groups over the length of the bearer members 8. However, such apertures 11—13 may also be present either additionally or exclusively in the cross bearer members 8' and 8", as well as possibly in cross bearer member 8''' which extend at the front or rear edge of the roof and in the center thereof and interconnect the two longitudinal bearer members 8. It may thereby be appropriate to divide the plenum chamber 16 as well as the cross bearer members 8', 8" and 8''' in an air-tight manner in the longitudinal center plane of the vehicle by suitable partition means 28, 29, 30 and 31, respectively so that a flow from one vehicle side to the other can only take place over a path through the vehicle interior space. Partition 28 thus effectively divides chamber 16 into inlet and outlet portions or passages.

If a forced draft ventilation installation is provided for the motor vehicle, then an air exhaust or discharge line 14 is connected with the ventilating channel 3. The exhaust line 14 which for purposes of illustration is shown in FIGURE 3 as connected to the lower part of channel 3 leads over a connecting line 15 to a ventilator or blower 15'. Depending on whether the air exhaust or discharge line 15 is operatively interconnected in the upper or lower part of the ventilating channel 3, more or less recirculated or fresh air is drawn in by the blower 15' through lines 14 and 15. In order to enable, at will, a selective adjustment of the fresh-air-to-recirculated-air ratio, it is possible to construct the cross section of one of the two inlet apertures 6 and 9, for example, that of the slots 6 in an adjustable manner, for example, by a slide member 22 slidable between guide bars 23 and 24 of any suitable conventional construction. The slide member 22 is provided with slots 6' arranged to selectively engage with the apertures 6. Slide member 22 is actuatable from the interior space of the vehicle in any known manner, for example, by means of a lever 25 rotatably secured within channel 3 by means of an angular member 26 and fastened to slide member 22 by a bolt 27.

FIGURE 4 shows diagrammatically one method of operating a ventilating system in accordance with the present invention. As shown therein, fresh air is drawn through apertures 6 on the left side, joins with recirculated air in ventilating channel 3, and is passed into exhaust line 14 which leads into connecting line 15. Blower 15' forces the combined air stream into channel 3 at the other side of the vehicle. A portion of the air is vented through apertures 6 while the remaining portion of the air is passed into chamber 16 and vents into the vehicle interior.

While I have shown and described two embodiments in accordance with the present invention, it is understood that the same is not limited thereto but is susceptible of many changes and modifications within the spirit and scope of the present invention, and I therefore do not wish to be limited to the specific embodiments illustrated herein but intend to cover all such changes and modifications within the scope and spirit of the present invention as encompassed by the scope of the appended claims.

I claim:

1. A ventilating system for motor vehicles having a vehicle outer body wall and door means in the sides thereof, comprising ventilating channel means comprising spaced walls and including said outer body wall, means for supporting said ventilating channel means in a position in which said channel means extends along the rear edge of said door means in essential parallelism with said edge, air aperture means in said vehicle outer body wall and rearwardly of said door means to place said ventilating channel means into communication with the atmosphere, and said vehicle having roof means including outer body wall means and porous ceiling means disposed on the inside thereof, communicating means between said ventilating channel means and the space formed between said wall means and said porous ceiling means whereby air is supplied to or exhausted from the vehicle interior space through said porous ceiling means, said ventilating channel means and said air aperture means.

2. A ventilating system for motor vehicles according to claim 1, wherein said outer body wall includes wall portions defining a pocket-like indentation and wherein said indentation has an approximately triangular cross section in a horizontal cross sectional view.

3. A ventilating system for motor vehicles according to claim 2, wherein the forward side of said triangular cross section is disposed essentially perpendicular to a portion of the outer body wall adjacent said pocket-like recess and is provided with said air aperture means in the form of slots.

4. A ventilating system for motor vehicles according to claim 1, further comprising hollow longitudinal roof bearer means located beneath said vehicle roof means and provided with apertures and operatively connected with said ventilating channel means and with said space between said wall means and said porous ceiling means to enable the flow of ventilating air through said longitudinal roof bearer means.

5. A ventilating system for motor vehicles according to claim 1, further comprising hollow cross roof bearer means provided with apertures and operatively connected with said ventilating channel means to form part of said ventilating system.

6. A ventilating system for motor vehicles according to claim 1, wherein said communicating means include hollow roof bearer means provided with apertures on the side thereof facing said ceiling means and with apertures operatively communicating with said ventilating channel means.

7. A ventilating system for motor vehicles according to claim 1, further comprising means dividing said space between said wall means and said ceiling means in an airtight manner essentially in the longitudinal central plane of the vehicle whereby said space is divided into inlet and outlet portions.

8. A ventilating system for motor vehicles according to claim 4 further comprising hollow transverse cross bearer means located beneath said vehicle roof means and having means for communication with said hollow longitudinal roof bearer means, on the one hand, and with said space between said wall means and said ceiling means, on the other, and means dividing said hollow cross bearer means in said space in an airtight manner essentially in the vehicle longitudinal center plane to thereby form inlet and outlet passage means within said hollow cross bearer means.

9. A ventilating system for motor vehicles having a vehicle outer body wall and door means in the sides thereof, comprising ventilating channel means comprising spaced walls and including said outer body wall, means for supporting said ventilating channel means in a position in which said channel means extends along the rear edge of said door means, air aperture means in the vehicle outer body wall to place said ventilating channel means into communication with the atmosphere, vehicle roof means including outer body wall means and porous ceiling means disposed on the inside thereof communicating means between said ventilating channel means and the space formed between said wall means and said ceiling means whereby air is supplied to or exhausted from the vehicle interior space through said porous ceiling means, said ventilating channel means and said air aperture means, exhaust means in communication with said ventilating channel means and including blower means to form a forced draft ventilating system, and means for selectively adjusting the ratio of fresh air to recirculated air in said ventilating system.

10. A ventilating system for motor vehicles according to claim 9, wherein said last-mentioned means includes slide means operative from within the vehicle interior space for selectively adjusting the cross section of said air aperture means.

11. A ventilating system for motor vehicles having a vehicle outer body wall and door means in opposite sides thereof, comprising ventilating channel means at each of said opposite sides comprising spaced walls and including said outer body wall, means for supporting said ventilating channel means so that said ventilating channel means extend adjacent the rear edges of opposite ones of said door means, air aperture means in said vehicle outer body wall to place each of said ventilating channel means into communication with the atmosphere, vehicle roof means including outer body wall means and porous ceiling means disposed on the inside thereof, communicating means between said ventilating channel means and a space formed between said wall means and said ceiling means, and exhaust means in communication with each of said ventilating channel means and including blower means and conduit means connecting said blower means with each of said ventilating channel means.

References Cited in the file of this patent

UNITED STATES PATENTS

| | | |
|---|---|---|
| 2,093,860 | Austin | Sept. 21, 1937 |
| 2,388,419 | Komenda | Nov. 6, 1945 |
| 2,463,715 | Randall | Mar. 8, 1949 |
| 2,731,098 | Saives | Jan. 17, 1956 |
| 2,764,078 | Tell | Sept. 25, 1956 |

FOREIGN PATENTS

| | | |
|---|---|---|
| 368,060 | Great Britain | Mar. 3, 1932 |
| 1,031,658 | Germany | June 4, 1958 |